(12) United States Patent
Watanabe et al.

(10) Patent No.: US 9,277,065 B2
(45) Date of Patent: Mar. 1, 2016

(54) FACSIMILE APPARATUS

(71) Applicant: BROTHER KOGYO KABUSHIKI KAISHA, Nagoya-shi, Aichi-ken (JP)

(72) Inventors: Junji Watanabe, Nagoya (JP); Naoki Nishikawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/496,873

(22) Filed: Sep. 25, 2014

(65) Prior Publication Data

US 2015/0092249 A1    Apr. 2, 2015

(30) Foreign Application Priority Data

Sep. 30, 2013    (JP) .................................. 2013-203149

(51) Int. Cl.
G06F 3/12    (2006.01)
G06K 15/00    (2006.01)
H04N 1/00    (2006.01)
H04N 1/327    (2006.01)

(52) U.S. Cl.
CPC ....... H04N 1/00206 (2013.01); H04N 1/32702 (2013.01); H04N 1/32789 (2013.01)

(58) Field of Classification Search
None
See application file for complete search history.

(56) References Cited

U.S. PATENT DOCUMENTS

| | | | |
|---|---|---|---|
| 5,603,031 A * | 2/1997 | White et al. ................... | 719/317 |
| 5,872,845 A * | 2/1999 | Feder ............................ | 358/442 |
| 6,145,011 A * | 11/2000 | Furukawa et al. ............ | 709/245 |
| 6,614,781 B1 * | 9/2003 | Elliott et al. .................. | 370/352 |
| 8,879,090 B1 * | 11/2014 | Ichida ...................... | G07F 17/26 |
| | | | 358/1.14 |
| 8,970,881 B1 * | 3/2015 | Schwarz ............ | H04N 1/00204 |
| | | | 358/1.13 |
| 9,031,382 B1 * | 5/2015 | Kaiser et al. .................. | 386/248 |
| 2002/0198745 A1 * | 12/2002 | Scheinuk et al. ................. | 705/4 |
| 2007/0146802 A1 * | 6/2007 | Ushida .......................... | 358/402 |
| 2008/0019492 A1 * | 1/2008 | Jyoti ........................ | 379/100.01 |
| 2009/0052642 A1 * | 2/2009 | Tackin et al. .............. | 379/93.05 |
| 2009/0254971 A1 * | 10/2009 | Herz et al. ......................... | 726/1 |
| 2010/0198590 A1 * | 8/2010 | Tackin et al. .................. | 704/214 |
| 2010/0214590 A1 * | 8/2010 | Ray et al. ........... | H04N 1/32112 |
| | | | 358/1.14 |
| 2010/0253962 A1 * | 10/2010 | Higuchi et al. .............. | 358/1.13 |
| 2010/0259788 A1 * | 10/2010 | Sakuda et al. ............... | 358/1.15 |

(Continued)

FOREIGN PATENT DOCUMENTS

| | | |
|---|---|---|
| JP | 08-317176 A | 11/1996 |
| JP | 2002-064690 A | 2/2002 |
| JP | 2002-305639 A | 10/2002 |

*Primary Examiner* — Madelein Nguyen
(74) *Attorney, Agent, or Firm* — Merchant & Gould PC

(57) ABSTRACT

A facsimile apparatus includes a first interface configured to connect to a telephone line; a second interface configured to connect to a network, and a controller. The controller is configured to execute: a detection processing in which the controller detects reception of a signal indicating transmission of facsimile data, and an upload processing in which the controller transmits facsimile data, which is received from a transmission source apparatus to an upload destination server, which is an upload destination apparatus. When executing the upload processing, the controller is configured to further execute an obtaining processing in which the controller obtains a reception capability of the upload destination server, a determining processing in which the controller determines capability information on the basis of the reception capability, and a notification processing in which the controller notifies the transmission source apparatus of the capability information determined in the determination processing.

19 Claims, 12 Drawing Sheets

(56) References Cited

U.S. PATENT DOCUMENTS

| | | | |
|---|---|---|---|
| 2011/0208710 A1* | 8/2011 | Lesavich | 707/706 |
| 2011/0296498 A1* | 12/2011 | Gajadevasangary et al. | 726/4 |
| 2012/0008753 A1* | 1/2012 | Burnett et al. | 379/88.17 |
| 2012/0120439 A1* | 5/2012 | Minagawa | 358/1.15 |
| 2012/0162703 A1* | 6/2012 | Ishiguro et al. | G03G 15/502 358/1.15 |
| 2013/0003132 A1* | 1/2013 | Ashmore et al. | 358/442 |
| 2013/0195262 A1* | 8/2013 | Hanes et al. | 379/100.05 |
| 2013/0250347 A1* | 9/2013 | Kono | H04N 1/00204 358/1.15 |
| 2014/0075418 A1* | 3/2014 | Bates et al. | 717/129 |
| 2014/0078544 A1* | 3/2014 | Motoyama et al. | G06F 21/6218 358/1.15 |
| 2014/0129607 A1* | 5/2014 | Nagumo | 709/201 |
| 2014/0189792 A1* | 7/2014 | Lesavich et al. | 726/3 |
| 2015/0015908 A1* | 1/2015 | Tanaka | G06K 15/4095 358/1.14 |
| 2015/0087331 A1* | 3/2015 | Yang et al. | 455/456.1 |
| 2015/0100628 A1* | 4/2015 | LaPine et al. | 709/203 |

* cited by examiner

FIG. 3

| DIS(Digital Identification Signal) | | classification | Server free capacity | | Server-processable data format | | | Conversion server | |
|---|---|---|---|---|---|---|---|---|---|
| bit | item | | large | small | JPEG | FAX data | PDF(others) | available | unavailable |
| 15 | 200×200 pixels/25.4mm | resolution | × | ○ | - | - | - | ○ | ○ |
| 16 | two-dimensional coding capability | format | ○ | ○ | × | ○ | ○ | ○ | × |
| 17,18 | recording width capability | image size | 255 | 215 | - | - | - | 255 | 215 |
| 19,20 | maximum recording length capability | image size | No limit | A4 | - | - | - | No limit | A4 |
| 26 | non-compression mode | format | ○ | × | × | ○ | - | ○ | × |
| 36 | TTC standard JT-T43 coding | format | ○ | ○ | × | ○ | ○ | ○ | × |
| 42 | 300×300 pixels/25.4mm | resolution | × | ○ | - | - | - | ○ | ○ |
| 43 | 400×400 pixels/25.4mm | resolution | × | × | - | - | - | ○ | ○ |
| 68 | JPEG coding | format | ○ | × | ○ | × | ○ | ○ | × |
| 69 | full color mode | color | ○ | × | - | - | - | ○ | × |
| 71 | 12bits/pixel/element | resolution | ○ | × | - | - | - | ○ | × |
| 76 | North America letter capability | image size | ○ | × | - | - | - | ○ | × |
| 77 | North America legal capability | image size | ○ | × | - | - | - | ○ | × |
| 78 | single layer sequential coding (TTC standard JT-T85) basic capability | format | ○ | × | × | ○ | ○ | ○ | × |
| 97 | 300×300 or 400×400 pixels/25.4mm for color/monochrome plural values | resolution | × | × | - | - | - | ○ | × |
| 98 | 100×100 pixels/25.4mm for color/monochrome plural values | resolution | ○ | ○ | - | - | - | ○ | × |
| 105 | 600×600 pixels/25.4mm | resolution | ○ | × | - | - | - | ○ | ○ |
| 106 | 1200×1200 pixels/25.4mm | resolution | ○ | × | - | - | - | ○ | × |
| 107 | 300×600 pixels/25.4mm | resolution | × | × | - | - | - | ○ | × |
| 108 | 400×800 pixels/25.4mm | resolution | × | × | - | - | - | ○ | × |
| 109 | 600×1200 pixels/25.4mm | resolution | ○ | × | - | - | - | ○ | × |
| 110 | 600×600/25.4mm for color/monochrome plural values | resolution | ○ | × | - | - | - | ○ | × |
| 111 | 1200×1200/25.4mm for color/monochrome plural values | resolution | ○ | × | - | - | - | ○ | × |

FIG.11

| information to be obtained | reliability | | |
|---|---|---|---|
| | high | medium | low |
| connection admission/denial | O | O | O |
| free capacity | O | × | × |
| processing capability | O | × | × |
| communication speed | O | O | × |

FIG.12

Please select a degree to secure the reliability of the upload reliability  ● high
            ○ medium
            ○ low

[HELP]  [OK]

FACSIMILE APPARATUS

CROSS-REFERENCE TO RELATED APPLICATION

This application is based upon and claims the benefit of priority from Japanese Patent Application No. 2018-203149, filed Sep. 30, 2013; the entire contents of which are incorporated herein by reference.

BACKGROUND

1. Technical Field

The present invention relates to a facsimile (FAX) apparatus. More specifically, the present invention relates to a FAX apparatus having an upload function of uploading received FAX data to another apparatus.

2. Description of the Related Art

A FAX apparatus having a transmission function of transmitting received FAX data to another FAX apparatus has been known. A transmission source as the FAX apparatus has a communication history with of a transmission destination as said another FAX apparatus. When a reception capability of transmission destination is determined based on the communication history. The transmission source as the FAX apparatus responds capability information based on the reception capability.

SUMMARY OF THE INVENTION

However, according to the above technology, a following problem occurs. That is, the transmission destination is said another FAX apparatus, and the transmission resource transmits and receives the capability information of said another FAX apparatus. In the meantime, a case where the transmission destination is an apparatus except for a FAX apparatus is not considered. Therefore, there is a room for improvement.

It is therefore an object of the present invention to provide a FAX apparatus capable of performing favorable communication with an apparatus except for a FAX apparatus even when uploading received FAX data to the apparatus.

The present invention provides a facsimile apparatus comprising a first interface configured to connect to a telephone line; a second interface configured to connect to a network, and a controller, wherein the controller is configured to execute: a detection processing in which the controller detects reception of a signal indicating transmission of facsimile data; an obtaining processing in which the controller obtains a reception capability of an upload destination server; a reception processing in which the controller receives facsimile data from a transmission source apparatus through the first interface; and an upload processing in which the controller transmits the facsimile data received in the reception processing to the upload destination server through the second interface, wherein when executing the upload processing, the controller is configured to further execute: a determination processing in which the controller determines, in response to the reception of the signal indicating the transmission of the facsimile data, at least capability information on the basis of the reception capability obtained in the obtaining processing, and a notification processing in which the controller notifies the transmission source apparatus of the capability information determined in the determination processing before the controller starts to receive the facsimile data from the transmission source apparatus in the reception processing.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIG. 3 illustrates a part of contents of a DIS.

FIG. 11 illustrates an example of selection information.

FIG. 12 illustrates an example of a selection screen.

DETAILED DESCRIPTION OF THE EMBODIMENTS

Hereinafter, an illustrative embodiment implementing the FAX apparatus of the present invention will be described in detail with reference to the accompanying drawings. In this illustrative embodiment, the present invention is applied to an MFP (Multi Function Peripheral) having transmission/reception and upload functions of FAX.

Figure 1:
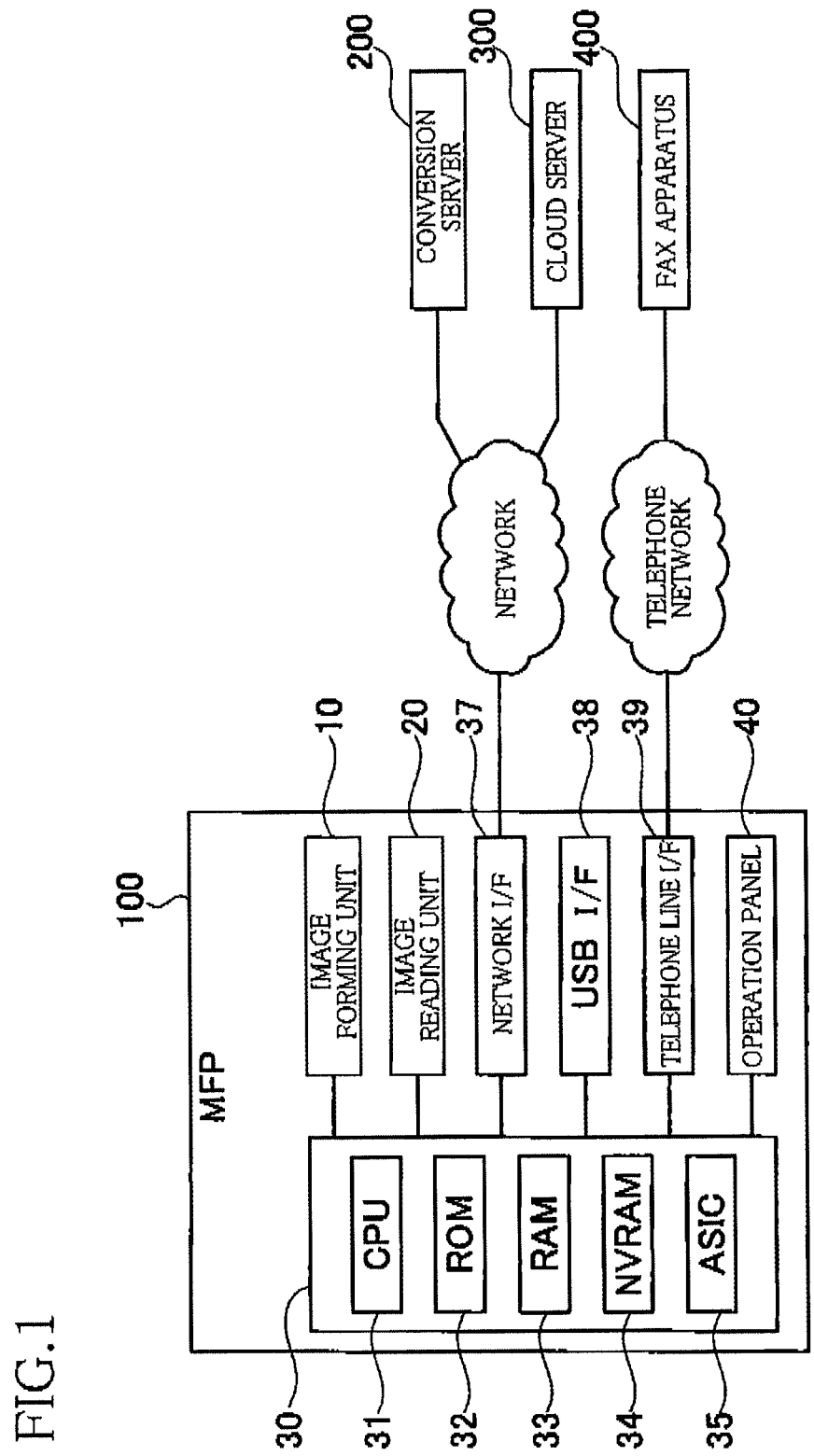
FIG. 1 is a block diagram illustrating an electrical configuration of an MFP according to an illustrative embodiment.

As illustrated in FIG. 1, an MFP 100 of this illustrative embodiment is connected in communication with a variety of external devices through a network and a telephone network (PSTN: Public Switched Telephone Network). Specifically, the MFP 100 can perform communication with a conversion server 200 and a cloud server 300 through the network, for example. Also, the MFP 100 can transmit and receive the FAX to and from a FAX apparatus 400 through the telephone network.

As illustrated in FIG. 1, the MFP 100 comprises a controller 30 including a CPU 31, a ROM 32, a RAM 38, an NVRAM (non-transitory RAM) 84 and an ASIC 35. Also, the MFP 100 comprises an image forming unit 10, an image reading unit 20, a network interface 37, a USB interface 88, a telephone line interface 39 and an operation panel 40, which are electrically connected to the controller 80.

The ROM 32 is configured to store therein a variety of control programs for controlling the MFP 100, a variety of settings, initial values and the like. The RAM 38 is configured to be used as a work area to which the various control programs are read or as a storage area for temporarily storing therein data. The NVRAM 34 is configured to store therein data such as image data, various user settings and the like.

The CPU 31 is configured to store a processing result in the RAM 883 or NVRAM 84 and to control the respective constitutional elements of the MFP 100, in response to the control programs read out from the ROM 82. The CPU 81 is an example of the controller. In the meantime, the controller 30 may be the controller and the ASIC 35 may be the controller. The controller 30 of FIG. 1 is a collective name of hardware used for control of the MFP 100 such as CPU 31 and does not indicate the single hardware actually provided for the MFP 100.

The network interface 37 is hardware configured to perform communication with the network through a LAN cable and the like. The USB interface 38 is hardware configured to perform communication with an apparatus connected through a USB cable and the like. The telephone line interface 39 is hardware configured to perform communication with another device connected to the telephone network through the telephone line. The network interface 87 and the USB interface 38 are examples of the second connection unit and the telephone line interface 39 is an example of the first connection unit.

The image forming unit 10 is configured to print an image on a sheet. An image forming type of the image forming unit 10 may be an electrophotographic or inkjet type. Also, the image forming unit 10 may form a color image or form only a monochrome image. Also, the image reading unit 20 is configured to read an image of a document. A reading mechanism thereof may be a CCD or CIS. Also, the image reading unit 20 may read a color image or read only a monochrome image.

Also, the operation panel 40 is configured to display user information and to receive an instruction input of a user. The operation panel 40 has a liquid crystal monitor and a button group consisting of a start key, a stop key, a ten-key and the like.

The conversion server 200 is an external apparatus for conversion processing of image data. As the conversion processing, conversion processing between data formats such as JPEG data, PDF data, PDL data, BMP data and the like may be exemplified. The conversion server 200 can convert image data received from the MFP 100, return the converted data to the MFP 100 and transmit the same to the cloud server 300.

The cloud server 300 is an external apparatus configured to store therein FAX data uploaded by the MFP 100. The cloud server 300 is an example of the upload destination server. In the meantime, the conversion server 200 and the cloud server 300 are not limited to the configuration implemented by one computer and may be a plurality of computers, a cloud system and the like. Also, the FAX apparatus 400 is an external apparatus capable of transmitting and receiving FAX.

Figure 2:
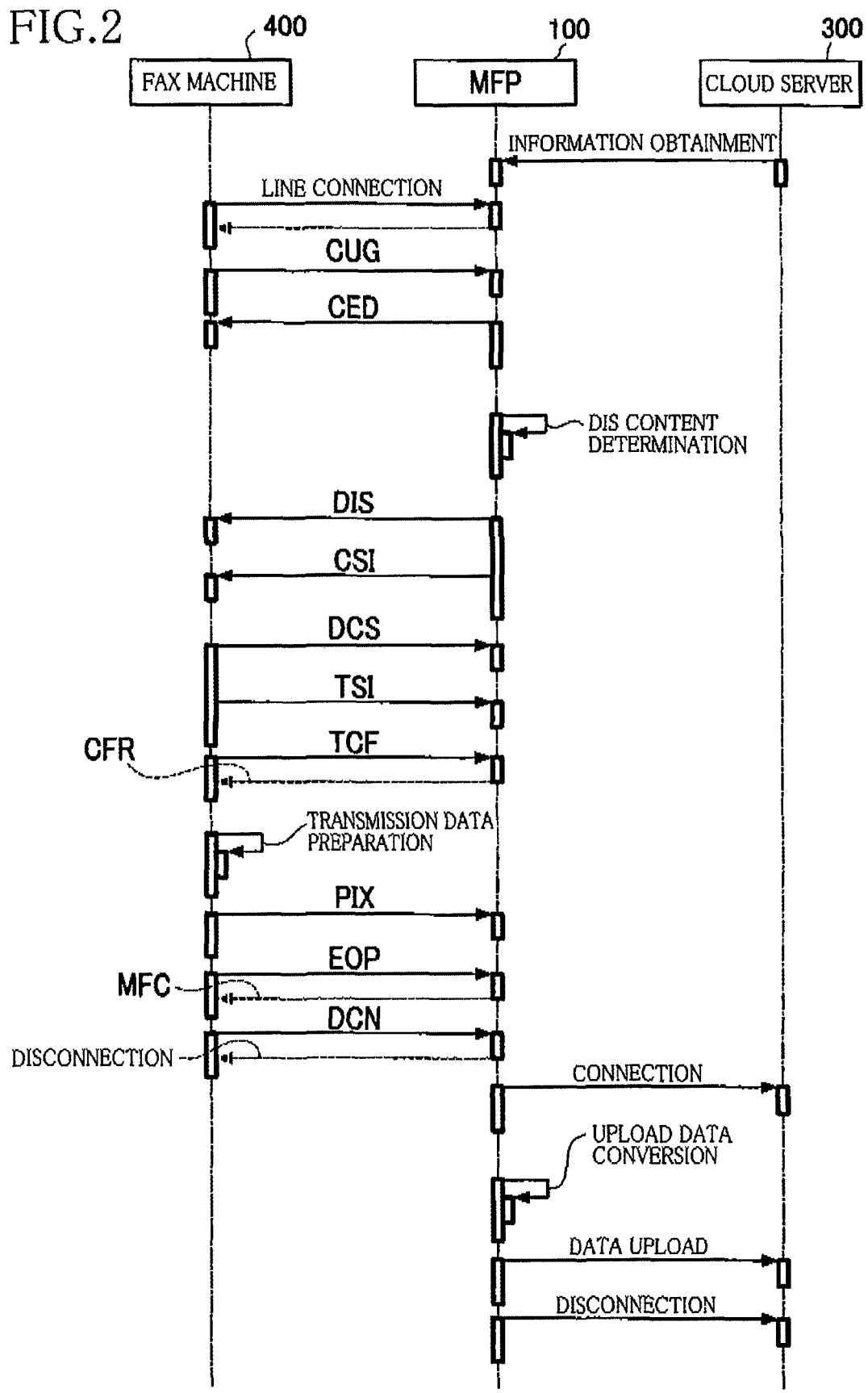
FIG. 2 is a sequence diagram showing a sequence of reception and upload of FAX data.

Subsequently, a sequence of FAX reception that is executed in the MFP 100 is described with reference to FIG. 2. The MFP 100 has an upload function of receiving FAX data from the FAX apparatus 400, which is a transmission source apparatus of the FAX data, and uploading the received the FAX data to the cloud server 300. FIG. 2 illustrates a sequence that is executed in the MFP 100 when the FAX transmitted from the FAX apparatus 400 arrives at the MFP 100 in a state in which the upload function of the MFP 100 is valid. That is, FIG. 2 shows a sequence of the upload that is performed between the MFP 100 and the cloud server 300, in addition to a sequence of transmission and reception of the FAX that is performed between the MFP 100 and the FAX apparatus 400. In the meantime, the sequence of transmission and reception of the FAX is an international standard and only an outline thereof is here described.

Meanwhile, in FIG. 2, the MFP 100 obtains information from the cloud server 300 before the transmission and reception of the FAX data. For example, the MFP 100 is periodically connected to the cloud server 300 and obtains and stores therein a variety of information about the FAX reception. However, the MFP 100 may be connected to the cloud server 800 after a reception of the FAX data, and obtain the information. The obtained information will be described later.

First, the FAX apparatus 400 calls the MFP 100 and the MFP 100 receives the call, so that a line is connected. Then, a CUG signal (a signal indicating transmission of FAX) is transmitted from the FAX apparatus 400 and the MFP 100 sends back a CED signal (a signal indicating that FAX can be received), so that the MFP 100 and the FAX apparatus 400 confirm initiation of FAX communication. That is, the MFP 100 receives the CUG signal to detect an arrival of the FAX.

Then, the information for determining communication settings such as a communication speed, a resolution and the like is transmitted and received between the FAX apparatus 400 and the MFP 100. Specifically, the MFP 100 transmits a receivable maximum capability to the FAX apparatus 400, as a DIS (a reception-side capability notification). Based on the received DIS and a capability of the FAX apparatus 400, the FAX apparatus 400 determines a communication setting in conformity to the minor one of two capabilities and notifies the determined communication setting to the MFP 100, as a DOS (a transmission source transmission condition). That is, the DIS is the capability information of a reception-aside apparatus to be notified to a transmission source apparatus as the FAX apparatus 400. The content of the DIS that is transmitted by the MFP 100 will be described later. In the meantime, the MFP 100 transmits a CSI (a receiver registration telephone number) after transmitting the DIS, and receives a TSI (a transmitter registration telephone number) after receiving the DCS.

After transmitting and receiving the DIS and the DCS, in order to check communication establishment by the communication setting notified with the DCS, the FAX apparatus 400 transmits a TCF (a training signal). The MFP 100 having safely received the TCF transmits a CFR (a training signal OK notification). When an error occurs upon a receipt of the TCF, the transmission and reception of the training signal is again executed in a state in which the communication speed is slowed down.

After checking the communication establishment, the FAX apparatus 400 prepares transmission data on the basis of the established communication settings and transmits the prepared transmission data, as PIX (image data transmission). Further, when the transmission of all data is completed, the FAX apparatus 400 transmits an EOP (a transmission completion notification). When the EOP is received, the MFP 100 sends back an MFC (a normal reception notification). Further, when the FAX apparatus 400 transmits a DON (a line disconnection instruction), the line is disconnected. Thereby, the transmission and reception of the FAX is completed.

Then, the MFP 100 is connected to the cloud server 300 and uploads the FAX data received from the FAX apparatus 400 to the cloud server 300. In the meantime, when the MFP 100 has been already connected, the connection sequence is unnecessary. In a case where the conversion of the data is necessary upon the upload, the conversion processing is executed. As required, the MFP 100 may request the conversion server 200 to convert the FAX data and receive and upload the converted data. When the upload is completed, the MFP 100 disconnects the connection with the cloud server 300.

Subsequently, the DIS, which is notified to the transmission source apparatus of the FAX data from the reception-side apparatus of the FAX in advance of the transmission and reception of the FAX between the MFP 100 and the FAX apparatus 400, is described. The DIS is a digital identification signal for notifying a maximum reception capability of the reception-side apparatus to the transmission source apparatus, and a meaning indicated by each bit of the DIS is defined by the international standards.

For example, when the reception-side apparatus is a FAX apparatus, a signal in which flags such as a printable sheet size, a processable resolution and the like in the reception-side FAX apparatus are set and combined is notified to a FAX apparatus of a transmission source, as the DIS. An apparatus having a FAX communication function such as the MFP 100 has therein the DIS information in advance.

Meanwhile, the MFP 100 of this illustrative embodiment is connected to the cloud server 300 and has the upload function of uploading the received FAX data to the cloud server 300, as described above. The upload technology of the FAX data to a server is appropriate to computerization of FAX data and uniform management of the FAX data, for example.

When uploading the received FAX data to another apparatus, the MFP 100 preferably receives the FAX data suitable for the upload destination apparatus from the FAX apparatus 400 that is the transmission source. For this reason, when the MFP 100 uploads the received FAX data to the cloud server 300, the MFP 100 preferably determines a part of the DIS upon detecting the arrival of the signal indicating the transmission of the FAX, based on the reception capability of the cloud server 300. That is, the MFP 100 is configured to obtain capability information about the FAX reception from the cloud server 300, to add the obtained information to the reception capability information of the MFP 100 and to determine the DIS. In the meantime, the reception capability information of the cloud server 800 obtained by the MFP 100 also includes the other information, in addition to the DIS.

Specifically, the MFP 100 is configured to determine items relating to image data included in the FAX data, such as a resolution, an image size, a color setting and the like of the DIS by adding the information of the cloud server 300. Meanwhile, the MFP 100 is configured to determine the other items such as a communication speed, based on the information of the MFP. Alternatively, the MFP 100 may be configured to determine the DIS so as to exhibit the maximum function from the information of the cloud server 300 and the information of the MFP 100. In the meantime, the MFP 100 may be configured to store the reception capability of the cloud server 300 in a database and to read out and obtain the same from the database. Also, the MFP 100 may be configured to inquire of the cloud server 300 about the reception capability thereof and obtain the same therefrom whenever the signal indicating the transmission of the FAX.

Subsequently, the reception capability information of the cloud server 300, which relates to the determination of the DIS, is described. In order to determine the DIS, the MFP 100 is configured to obtain at least one of a variety of processing capability information and a variety of condition as regards the communication between the cloud server 300 and the MFP 100.

The processing capability information of the cloud server 300 is information about a data processing capability of the cloud server 300. For instance, a processable resolution and a processable data format of the cloud server 300 may be exemplified. Further, when the conversion server 200 can be used, a conversion capability of the conversion server 200 also corresponds to the processing capability information. The processing capability information does not change over time. The MFP 100 is preferably configured to obtain in advance the processing capability information of the cloud server 300 and to store the same in the database.

Also, the situation information is information about a variety of situations relating to the communication between the MFP 100 and the cloud server 300. For instance, respective information of a free capacity of a storage unit of the cloud server 300, an operating load of the MFP 100, an error occurrence probability between the MFP 100 and the cloud server 300, and a communication speed between the MFP 100 and the cloud server 300 may be exemplified. Since the situation information changes depending on the situations, it is preferable to obtain the situation information from the cloud server 300 by the communication therebetween periodically or each time the MFP 100 receives the FAX.

The MFP 100 determines a part of the items of the DIS, based on at least one of the processing capability information and situation information of the cloud server 300. The items of the DIS include a variety of resolutions, a variety of image sizes, a data format, a color setting and the like, and the reception capability of each of the items is indicated by a value of a corresponding one of bits. That is, the DIS is a signal in which the respective bite indicating the capability information are set and combined on the basis of the respective reception capabilities of the items. The MFP 100 converts the information obtained from the cloud server 300 to determine the respective bits of the DIS, thereby determining the DIS conforming to the existing format.

In order to determine the DIS, the MFP 100 is configured to store contents of the obtained information and the items of the DIS determined based on the information in a table as illustrated in FIG. 3. At the left in FIG. 3, bit numbers of the DIS are indicated in a first column, respective items of data indicated by the bits are indicated in a second column and classifications of the respective items are indicated in a third column. Also, at the right in FIG. 3, when the uppermost information has a content described in a second line, a determination result of each bit of the DIS is indicated in a vertical column. Meanwhile, in FIG. 3, when the item of each bit is possible (i.e., it is possible for the MFP 100 to transmit, to the cloud server 300, the FAX data having the content of the item), it is denoted with 'o', when the item of each bit is not possible, it is denoted with 'x' and when both are acceptable, the corresponding item is denoted with '-'. When both are acceptable, the corresponding item is determined on the basis of the other conditions.

Meanwhile, FIG. 3 illustrated an example of a part of the table. More tables are prepared in the MFP 100, depending on types of the information obtained from the cloud server 300 and contents thereof. Also, the DIS includes items not illustrated in FIG. 3, for example, a data signal rate, a double-sided print capability and the like.

Subsequently, DIS determination processing of determining the value of the item of the DIS corresponding to each type of the information obtained from the cloud server 300 is described. In the below, first to eighth processing is individually described as regards each type of the information that is considered in the MFP 100. The MFP 100 can execute at least one processing of the first to eighth processing and is configured to select and execute one or more executable processing. In the meantime, when executing a plurality of processing, the processing may be executed sequentially or in parallel. The first to eighth processing that is described in the below is executed by the CPU 31 when the upload function is valid and the MFP 100 detects the arrival of the signal indicting the transmission of the FAX.

Also, after executing all the executable processing of the first to eighth processing, the MFP 100 determines an item of the DIS, which has not been determined yet, on the basis of the capability of the MFP 100. Thereby, the MFP 100 can determine all the items of the DIS. When the MFP 100 determines the DIS, the MFP 100 notifies the determined DIS to the FAX apparatus 400, which is the transmission source apparatus, in accordance with the sequence of the transmission and reception of the FAX described above. That is, each DIS determination processing is an example of the determination processing, and the sequence of notifying the determined DIS is an example of the notification processing.

Figure 4:
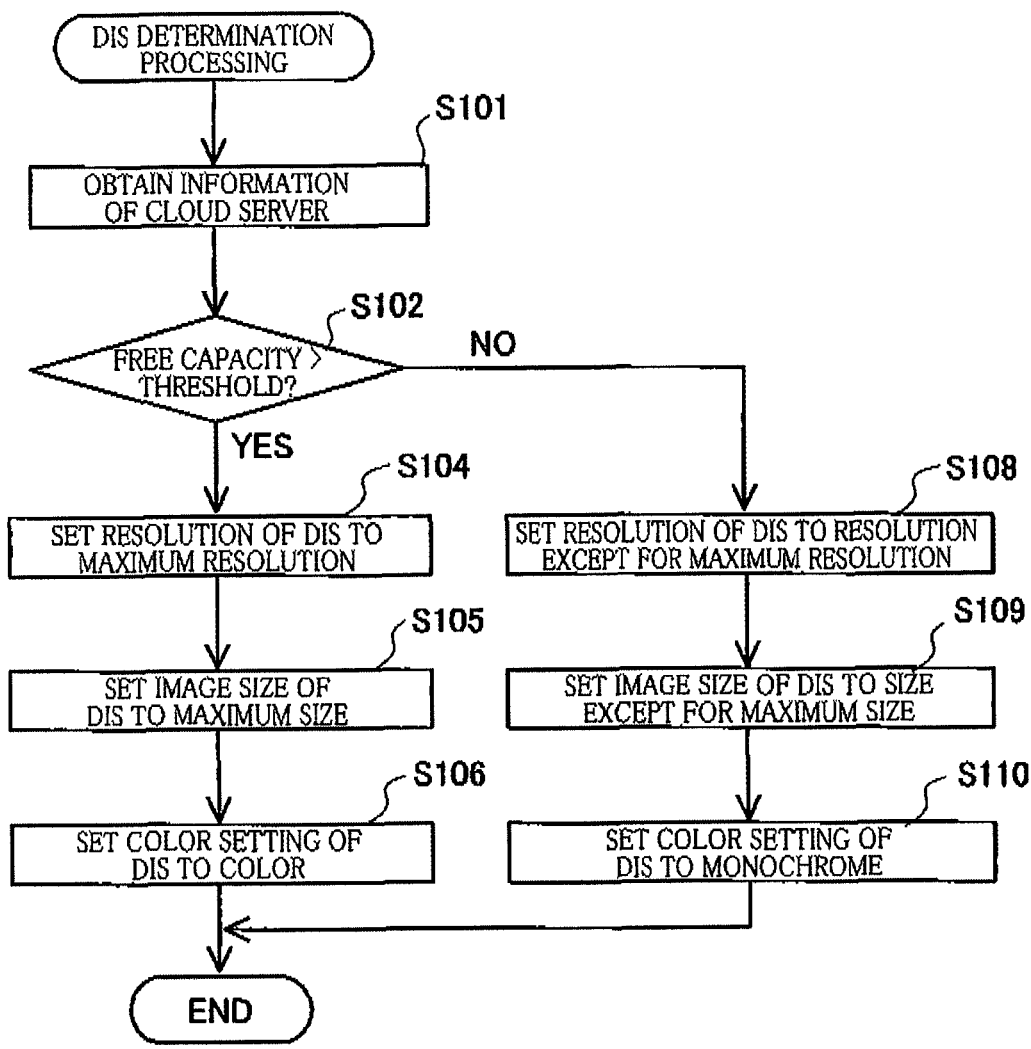
FIG. 4 is a flowchart showing a sequence of DIS determination processing.

First, a sequence of a first processing of the DIS determination processing of determining the DIS on the basis of the capability information of the cloud server 300 is described with reference to a flowchart of FIG. 4.

In the first processing of the DIS determination processing, the MFP 100 first obtains the information of the cloud server 300 (S101). The information obtained in S101 is the processing capability information and the situation information, which have been described above, and includes at least information of a free capacity of the storage area configured to store therein the FAX data, in this illustrative embodiment. The free capacity may a physical free capacity of the storage area of the cloud server 300 or a logical free capacity of an area allotted for FAX data.

Then, the MFP 100 determines whether the free capacity obtained in S101 is greater than a preset capacity threshold (S102). When it is determined that the free capacity is greater than the capacity threshold (S102: YES), the MFP 100 does not limit a capability about a data amount of the image data in the DIS. Specifically, the MFP 100 sets a resolution capability of the DIS to the maximum (S104). Then, the MFP 100 sets an image size of the DIS to the maximum (S105). Then, the MFP 100 sets a color setting of the DIS to a color (S106) and ends the DIS determination processing. In the meantime, the processing sequence of S104 to S106 may be an arbitrary sequence.

On the other hand, when it is determined that the free capacity is not greater than the capacity threshold (S102: NO), the MFP 100 limits a capability about a data amount of the image data in the DIS to prevent a memory full. Specifically, the MFP 100 sets a resolution capability of the DIS to a resolution except a maximum resolution (S108). Then, the MFP 100 sets an image size of the DIS to an image size except for a maximum size (S109). Then, the MFP 100 limits a color setting of the DIS to a monochrome (S110) and ends the DIS determination processing.

In the meantime, the processing sequence of S108 to S110 may be an arbitrary sequence. Also, the MFP 100 may execute only a part of S108 to S110 and may execute at least one processing, each corresponding to S104 to S106, each corresponding to the rest of S108 to S110. Also, the limiting extent in S108, S109 and S110 may be predetermined values or may be determined on the basis of the free capacity of the cloud server 300.

Figure 8:
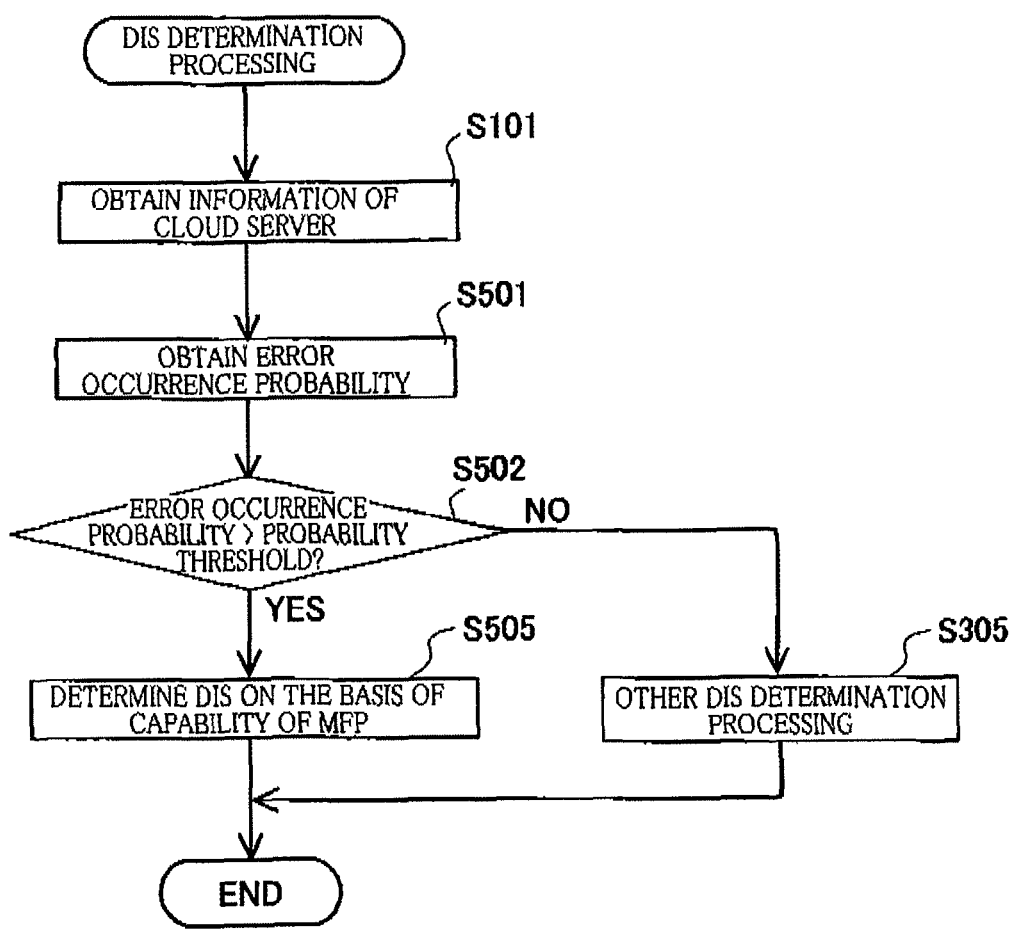
FIG. 8 is a flowchart showing a sequence of the DIS determination processing.

For example, as illustrated in FIG. 8, when the free capacity of the server is 'large', high-resolution data can be received. Thus, the item 'resolution: 1200×1200 pixels/25.4 mm' of a 106th bit of the DIS and the like are set to 'o'. On the other hand, when the free capacity of the server is 'small', the item and the like are set to 'x'. Further, when the free capacity of the server is 'large', the item 'image size: recording width capability' of 17th and 18th bits of the DIS is set to '255', and when the free capacity of the server is 'small', the corresponding item is set to '215'.

That is, when the free capacity in the storage area of the cloud server 300 is sufficient, a memory full is difficult to occur even though a data amount to be transmitted is large. Therefore, it is preferable not to limit a data amount of the image data. On the other hand, when there is no margin for the free capacity in the storage area of the cloud server 300, a data amount to be transmitted is limited so that it is not large. The permittable resolution and image size may be changed on the basis of the magnitude of the free capacity. After executing this processing, the MFP 100 may further execute the other DIS determination processing. Also, an item of the DIS, which is not related to the information of the cloud server 300, for example, an item of the communication speed is determined on the basis of the capability of the MFP 100.

In this way, by executing the first processing, the MFP 100 determines the DIS on the basis of the free capacity of the cloud server 300. That is, when the free capacity of the cloud server 300 is large, the MFP 100 receives data including information as much as possible, without limiting the data amount. On the other hand, when the free capacity of the cloud server 300 is not large, the MFP 100 limits a data amount to be received by the cloud server 300 so that it is small. That is, the MFP 100 notifies the FAX apparatus 400, which is the transmission source apparatus of the FAX, of the DIS in which the reception capability of the cloud server 300, which is the upload destination, is added to the reception capability of the MFP 100. Thereby, it is possible to expect the reception of maximum information through the communication with the cloud server 300 while avoiding the memory full.

Figure 5:
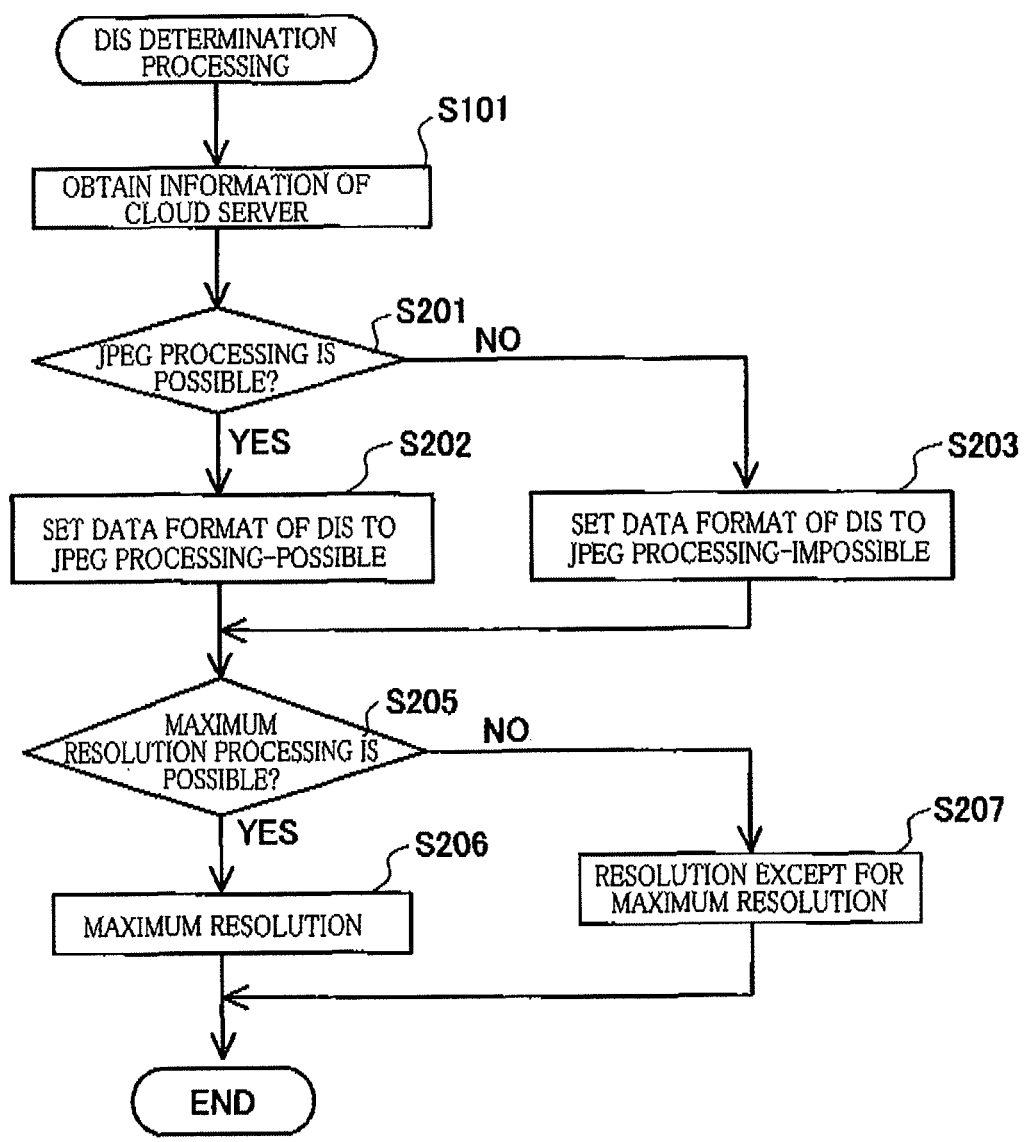
FIG. 5 is a flowchart showing a sequence of the DIS determination processing.

Subsequently, a sequence of a second processing of the DIS determination processing of determining the DIS on the basis of the capability information of the cloud server 300 is described with reference to a flowchart of FIG. 5. The second processing is different from the first processing, in that the DIS is determined so that the data conversion processing is unnecessary as much as possible. The same parts as the first processing are denoted with the same reference numerals and the descriptions thereof are omitted.

Like the first processing, also even in the second processing of the DIS determination processing, the MFP 100 first obtains the information of the cloud server 300 (S101). In this processing, the information obtained in S101 is the processing capability information described above and includes at least a data format and a resolution that can be processed by the cloud server 300. Then, the MFP 100 determines whether the cloud server 800 can process image data of a JPEG format (S201).

When it is determined that the cloud server 300 can process image data of a JPEG format (S201: YES), the MFP 100 sets the reception of JPEG to 'possible', which is one of the items of the data format of the DIS (S202). In the meantime, the DIS includes a flag indicating whether JPEG can be processed or not. On the other hand, when it is determined that the cloud server 300 cannot process image data of a JPEG format (S201: NO), the MFP 100 sets the reception of JPEG to 'impossible', which is one of the items of the data format of the DIS (S203).

When the cloud server 300 can process the image data of the JPEG format, the MFP 100 can upload the received data to the cloud server 300 without converting the same by enabling the FAX apparatus 400 to transmit the FAX data of a JPEG format, if possible. For example, as shown in FIG. 8, when the processable format of the server is 'JPEG' or 'PDF', an item 'format: JPEG code' of a 68th bit of the DIS is set to 'o' and when the processable format is 'the FAX data', the corresponding item is set to 'x'. 'o' is a symbol for OK and 'x' is a symbol for NG.

Then, the MFP 100 determines whether the cloud server 300 can process the image data of a maximum resolution within a range of the transmission and reception standards of the FAX (S205). When it is determined that the cloud server 300 can process the image data of a maximum resolution (S205: YES), the MFP 100 sets a resolution item of the items of the data format of the DIS to a 'maximum resolution' (S206). In the meantime, the DIS includes flap indicating resolutions of a plurality of levels. When the maximum resolution is set to be possible, the FAX data is transmitted with the maximum resolution within a capability range of the transmission source apparatus.

On the other hand, when it is determined that the cloud server 300 cannot process the image data of a maximum resolution (S205: NO), the MFP 100 sets the maximum resolution of the items of the data format of the DIS to 'not possible' (S207) and ends the DIS determination processing.

In this way, by executing the second processing, the MFP 100 determines the DIS so as to receive the FAX data having a data format and a resolution, which can be processed by the cloud server 300. That is, the DIS is determined while setting the range of the FAX data, which can be processed by the cloud server 300, as the receivable range. That is, the MFP 100 notifies the FAX apparatus 400, which is the transmission source apparatus of the FAX, of the DIS in which the reception capability of the cloud server 300, which is the upload destination, is added to the reception capability of the MFP 100. For this reason, a chance to perform the conversion processing in the cloud server 300 is reduced and an amount of data to be converted becomes also smaller. Therefore, it is possible to expect the reduction in the processing load of the MFP 100. Meanwhile, although the data format and the resolution are continuously determined in the second processing only any one processing may be determined.

Figure 6:
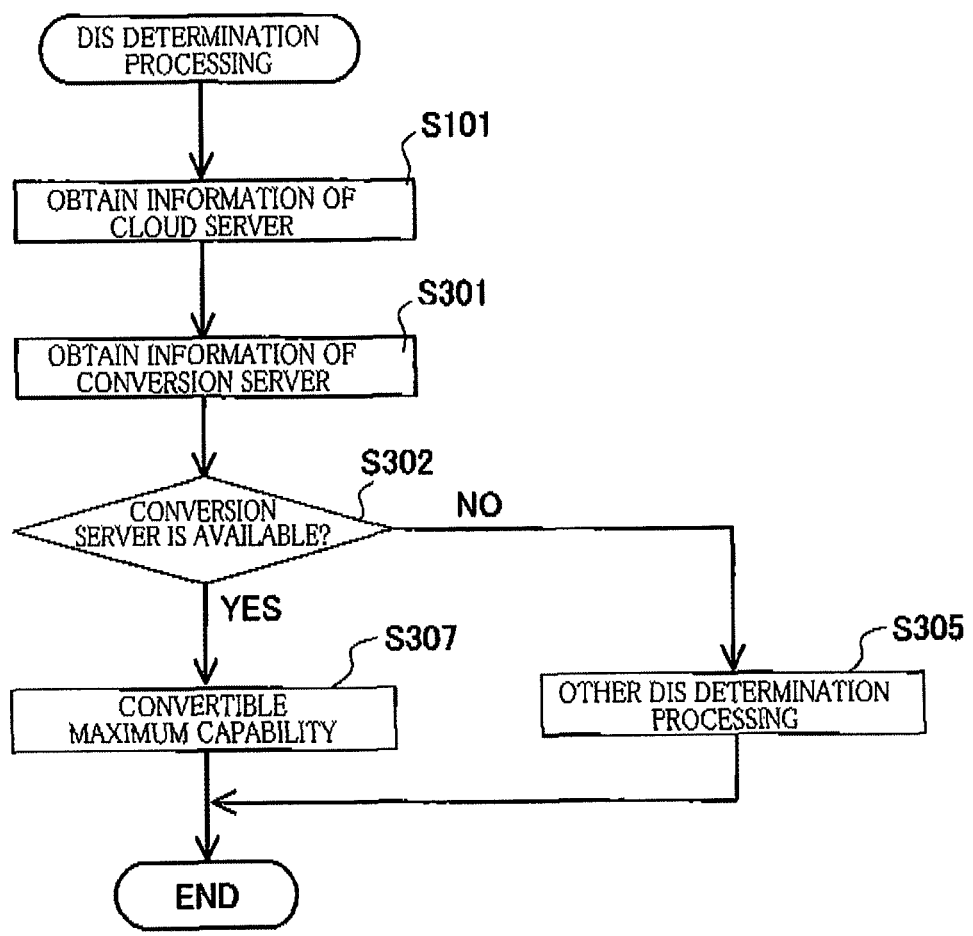
FIG. 6 is a flowchart showing a sequence of the DIS determination processing.

Subsequently, a sequence of a third processing of the DIS determination processing of determining the DIS, which is performed when the conversion server 200 configured to convert the image data is used, is described with reference to a flowchart of FIG. 6. The DIS determination processing of the third processing is different from the first processing, in that the DIS is determined on condition that the conversion server 200 can be used. The same parts as the first processing are denoted with the same reference numerals and the descriptions thereof are omitted.

Like the first processing, also in the third processing of the DIS determination processing, the MFP 100 first obtains the information of the cloud server 300 (S101). In this processing, the MFP 100 further obtains the information of the conversion server 200 (S501). The information of the conversion server 200 includes information indicating whether the conversion server 200 is available and information about a conversion capability of the conversion server 200, for example. As the conversion capability of the conversion server 200, processable data format, image size and resolution may be exemplified.

Then, the MFP 100 determines whether the conversion server 200 is currently available, based on the information obtained in S301 (S302). For example, when it is determined that the conversion server 200 cannot be used due to communication incapability with the conversion server 200, operation shutdown of the conversion server 200 and the like (S302: NO), the MFP 100 does not add the conversion capability of the conversion server 200 to the DIS. That is, the MFP 100 determines the DIS in which the reception capability of the cloud server 300 is added to the reception capability of the MFP 100 by using the first and second processings (S305).

On the other hand, when it is determined that the conversion server 200 is available (S302: YES), the MFP 100 sets the item relating to the FAX data of the DIS to the maximum within a conversion capability range of the conversion server 200. That is, the MFP 100 determines the resolution, image size and color processing capability items of the DIS on the basis of the conversion capability of the conversion server 200 (S307) and ends the DIS determination processing. For example, as illustrated in FIG. 8, when the conversion server 200 is 'available', an item 'color: full color mode' of a 69th bit of the DIS is set to '○' and when the conversion server 200 is 'unavailable', the corresponding item is set to 'x'.

In this way, by executing the third processing, the MFP 100 determines the DIS on the basis of the conversion capability of the conversion server 200 when the conversion server 200 is available. That is, the MFP 100 notifies the FAX apparatus 400, which is a transmission source apparatus of the FAX, of the DIS in which the conversion capability of the conversion server 200 is added to the reception capability of the MFP 100. On the other hand, when the conversion server 200 is unavailable, the MFP 100 determines the DIS on the basis of the capability of the MFP 100. Therefore, it is possible to effectively use the capability of the conversion server 200. In the meantime, it may be possible to add the reception capability of the cloud server 300, irrespective of whether the conversion server 200 is available.

Figure 7:
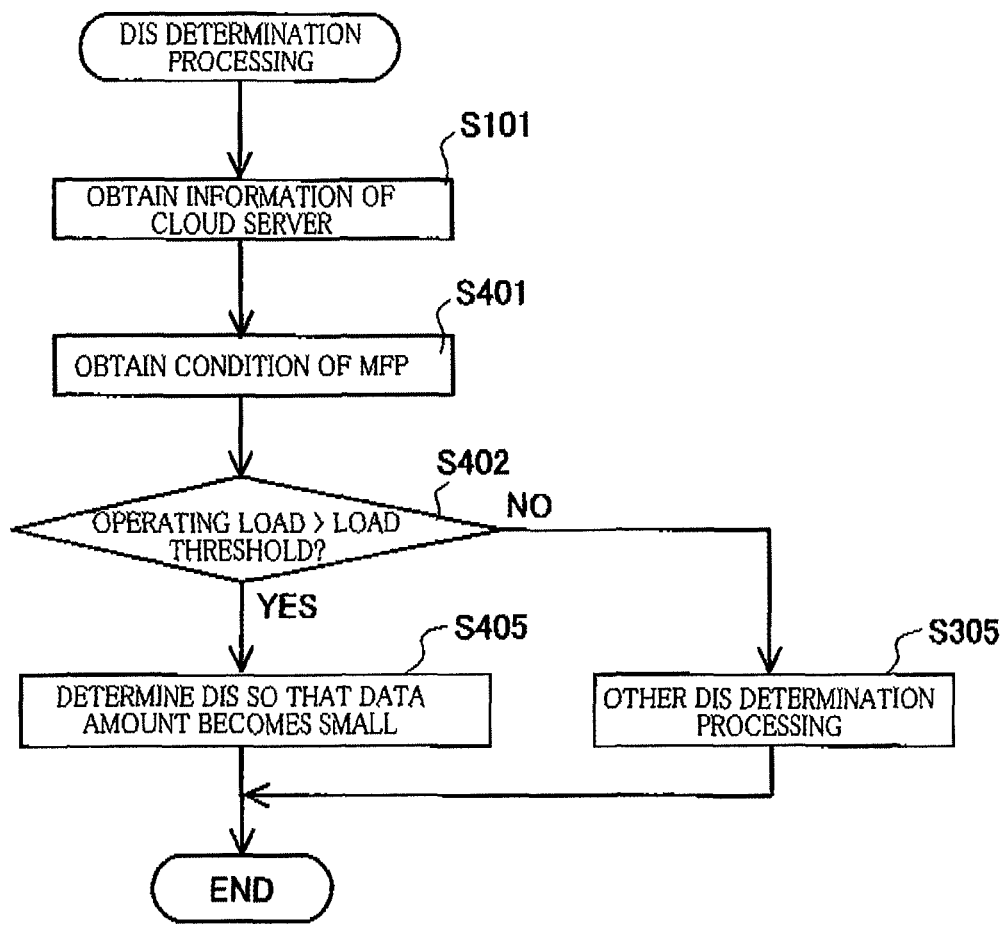
FIG. 7 is a flowchart showing a sequence of the DIS determination processing.

Subsequently, a sequence of a fourth processing of the DIS determination processing is described with reference to a flowchart of FIG. 7. The fourth processing is different from the first processing, in that a situation of the MFP 100 is considered. The same parts as the first processing are denoted with the same reference numerals and the descriptions thereof are omitted.

Like the first processing, also in the fourth processing of the DIS determination processing, the MFP 100 first obtains the information of the cloud server 300 (S101). In this processing, the MFP 100 further obtains information about a situation of the MFP 100 (S401). Specifically, the information about a level of an operating load of the MFP 100 is obtained. The level of the operating load can be determined on the basis of an average operation rate of the CPU 31 within a predetermined time period and the number of processes being operating, for example. Then, the MFP 100 determines whether the obtained operating load is higher than a preset load threshold (S402).

When it is determined that the operating load is not higher than the load threshold (S402: NO), a possibility that the MFP 100 will be overloaded is low. Therefore, the MFP 100 ends the DIS determination processing while determining that the DIS will be determined in the other DIS determination processing, without particularly considering the operating load (S305).

On the other hand, when it is determined that the operating load is higher than the load threshold (S402: YES), the MFP 100 determines the DIS so that a data processing amount in the MFP 100 becomes small (S406), and ends the DIS determination processing. Specifically, the MFP 100 limits at least one item of the resolution, the image size and the color processing capability, for example, and determines the DIS. For instance, the MFP 100 limits at least one item of the resolution among the resolution item to a resolution except the maximum resolution, the image size to an image size except for the maximum size and the color setting to a monochrome and determines the DIS. Alternatively, the MFP 100 permits only a data format, which is not necessary to convert in the MFP 100, and determines the DIS.

In this way, by executing the fourth processing, the MFP 100 determines the DIS on the basis of the level of the operating load of the MFP 100. That is, the MFP 100 determines the DIS so that a processing amount becomes small in the MFP 100 when the operating load of the MFP 100 is high. When the operating load of the MFP 100 is not high, the MFP 100 determines the DIS by adding the reception capability of the cloud server 300, which is the upload destination, to the reception capability of the MFP 100. That is, the MFP 100 notifies the FAX apparatus 400, which is the transmission source apparatus of the FAX, of the DIS in which the level of the operating load of the MFP 100 is added to the reception capability of the MFP 100 or other apparatus. As a result, it is possible to receive the FAX data within a range in which the operating load of the MFP 100 is not so high. Therefore, it is possible to expect the acquisition of the maximum information while reducing a possibility that a problem will occur in the operation of the MFP 100.

Subsequently, a sequence of a fifth processing of the DIS determination processing is described with reference to a flowchart of FIG. 8. The DIS determination processing of the fifth processing is different from the first processing, in that the DIS is determined, considering the situations of the MFP 100 and cloud server 300. The same parts as the first processing are denoted with the same reference numerals and the descriptions thereof are omitted.

Like the first processing, also in the fifth processing of the DIS determination processing, the MFP 100 first obtains the information of the cloud server 300 (S101). In this processing, the MFP 100 further obtains the information about an error occurrence probability between the MFP 100 and the cloud server 300 (S501). Then, the MFP 100 determines whether the obtained error occurrence probability is higher than a preset probability threshold (S502). In the meantime, a level of the error occurrence probability can be determined on the basis of an occurrence situation of a communication error and an error occurrence situation of an access authority and a using authority from the MFP 100 to the cloud server 300, for example.

When it is determined that the error occurrence probability is not higher than the preset probability threshold (S502: NO), a possibility that an error will occur and the upload will thus fail during the upload of the received FAX data to the cloud server 300 is low. Therefore, the MFP 100 ends the DIS determination processing while determining that the DIS will be determined in the other DIS determination processing, without particularly considering the error occurrence probability (S305).

On the other hand, when it is determined that the error occurrence probability is higher than the preset probability threshold (S502: YES), the MFP 100 considers a possibility that an error will occur during the upload of the received FAX data to the cloud server 300. That is, when an error occurs, since it is not possible to upload the FAX data to the cloud server 300, it is preferable to receive the FAX data that can be processed in the MFP 100. Therefore, the MFP 100 determines the DIS, based on the reception capability of the MFP 100 (S505). For example, the MFP 100 determines all items of the DIS on the basis of the capability of the MFP 100 so that the processing of storing the FAX data in the MFP 100, printing the FAX data with the MFP 100 and the like can be performed. After S505, the MFP 100 ends the DIS determination processing.

In this way, by executing the fifth processing, the MFP 100 determines the DIS, based on the error occurrence probability between the MFP 100 and the cloud server 300. That is, when the error occurrence probability is high, the MFP 100 determines the DIS so that the FAX data, which can be processed in the MFP 100, can be received. That is, the MFP 100 notifies the DIS in which the reception capability of the cloud server 300 is added to the reception capability of the MFP 100, depending on the level of the error occurrence probability. Therefore, even when the FAX data cannot be uploaded to the cloud server 300 due to an error, the FAX data can be processed in the MFP 100. For example, a possibility that the FAX data will be stored or printed in the MFP 100 is high.

In the meantime, when executing this processing in response to the arrival of the signal indicating the transmission of the FAX, the MFP 100 may connect to the cloud server 300 in S501 to determine whether the connection is possible. Thereby, the MFP 100 can further acquire the information indicating whether the connection between the MFP 100 and the cloud server 300 is possible. When the connection is not possible, the MFP 100 preferably executes S505, like the case where the error occurrence probability is high.

Figure 9:
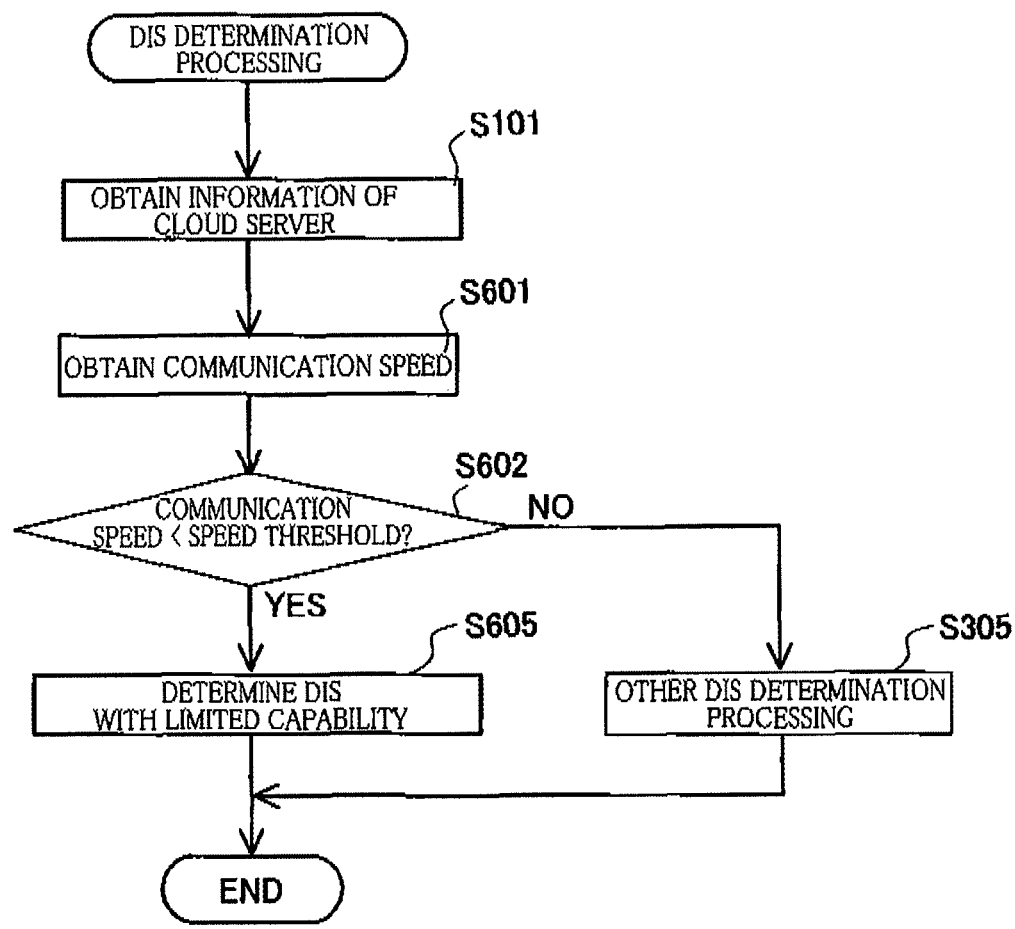
FIG. 9 is a flowchart showing a sequence of the DIS determination processing.

Subsequently, a sequence of a sixth processing of the DIS determination processing is described with reference to a flowchart of FIG. 9. The sixth processing is different from the first processing, in that the communication speed between the MFP 100 and the cloud server 300 is considered. The same parts as the first processing are denoted with the same reference numerals and the descriptions thereof are omitted.

Like the first processing, also in the sixth processing of the DIS determination processing, the MFP 100 first obtains the information of the cloud server 300 (S101). In this processing, the MFP 100 further obtains the information of the communication speed between the MFP 100 and the cloud server 300 (S601). Then, the MFP 100 determines whether the obtained communication speed is slower than a preset speed threshold (S602).

When it is determined that the communication speed is not slower than the speed threshold (S602: NO), a possibility that the network will be overloaded even when the FAX data is uploaded is low. Therefore, the MFP 100 ends the DIS determination processing while determining that the DIS will be determined in the other DIS determination processing, without particularly considering the communication speed (S305).

On the other hand, when it is determined that the communication speed is slower than the speed threshold (S602: YES), the MFP 100 determines the DIS so that a capability value thereof is limited, as compared to the capability of the cloud server 300 (S605), and ends the DIS determination processing. Specifically, the MFP 100 limits the capabilities of the resolution, image size and color processing capability items so that the data amount to be uploaded to the cloud server 300 becomes small, and determines the DIS. For example, the MFP 100 executes the same processing as S108 to S110 of the first processing.

In this way, by executing the sixth processing, the MFP 100 determines the DIS, based on the communication speed between the MFP 100 and the cloud server 300. That is, when the communication speed is slow, the MFP 100 determines the DIS so that the data amount to be uploaded is limited. That is, the MFP 100 notifies the DIS in which the reception capability of the cloud server 300 is added to the reception capability of the MFP 100, depending on the level of the communication speed. Therefore, it is possible to reduce an influence on the other devices due to the communication delay. Thus, even when the upload to the cloud server 300 is delayed, a possibility that a problem will occur in the operation of the MFP 100 is low.

Figure 10:
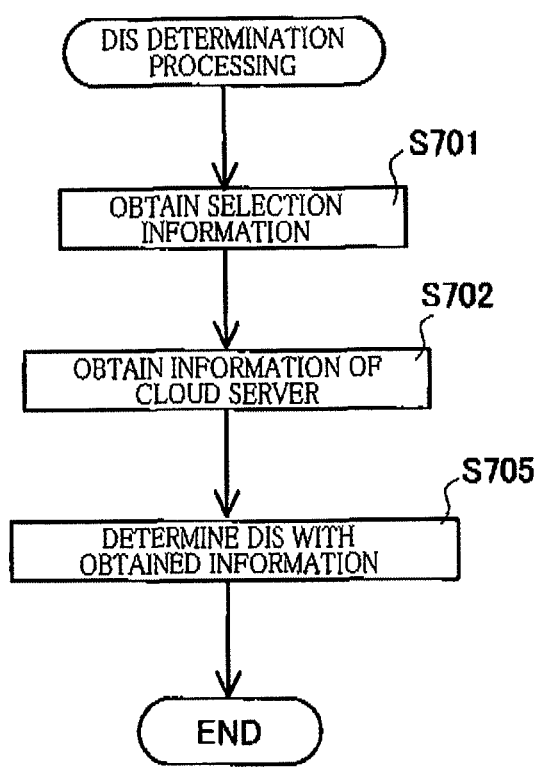
FIG. 10 is a flowchart showing a sequence of the DIS determination processing.

Subsequently, a sequence of a seventh processing of the DIS determination processing is described with reference to a flowchart of FIG. 10. The seventh processing is processing of determining information to be considered of the capabilities of the cloud server 300, based on the selection information set in the MFP 100. That is, this processing is executed in combination with one or more processing of the first to sixth processing.

In the sixth processing of the DIS determination processing, the MFP 100 first obtains the selection information set in the MFP 100 (S701). The selection information is information as the capability information of the cloud server 300 for selecting a type of the information to be obtained before the reception of the FAX. The information, which is a target of the selection, includes the free capacity of the cloud server 300, the connection admission/denial, the communication speed and the processing capability, for example. The MFP 100 determines whether or not to obtain the respective information, based on the selection information.

Specifically, as shown in FIG. 11, for example, regarding the selection information of the MFP 100, a plurality of types of settings are prepared in advance, depending on a degree to secure the reliability of the upload. The MFP 100 receives a setting of the selection information input by a user on a screen illustrated in FIG. 12, for example, at a timing at which the processing such as the transmission and reception of the FAX is not executed. The selection information is preset for each cloud server 300, which is used as the upload destination, and is stored in the MFP 100.

In FIG. 11, examples of the respective selection information corresponding to three levels of the reliability are illustrated. In each setting, when the corresponding information is obtained, it is denoted with 'o' and when the corresponding information is not obtained, it is denoted with 'x'. When the more types of the information are obtained, the reliability on the success of the upload is increased. However, since the processing sequence is increased, the processing load is increased. For example, the MFP 100 in which the setting of the high reliability is selected obtains all the information of the free capacity of the cloud server 300, the connection admission/denial, the communication speed and the processing capability. The MFP 100 in which the setting of the low reliability is selected obtains only the information about the connection admission/denial with the cloud server 300.

Then, the MFP 100 obtains the respective information of the cloud server 300, based on the obtained selection information (S702). That is, the information of the cloud server 300 obtained in S702 is information that is set to be obtained as the selection information. Within a range that can be determined with the obtained information, the MFP 100 executes at least one of the first to sixth processing (S705) to thus determine the DIS.

For example, the MFP 100 having the setting of 'low' reliability obtains only the information about the connection admission/denial with the cloud server 300 and executes only the fifth processing (refer to FIG. 8) considering the error occurrence probability. That is, when the connection is possible, the MFP 100 determines that the error occurrence probability is low, and determines that the DIS will be determined in the other DIS determination processing (S305). On the other hand, when the connection is not possible, the MFP 100 determines that the error occurrence probability is high, and determines the DIS on the basis of the capability of the MFP 100 (S505). In the meantime, the DIS of each case may be beforehand determined and stored in the MFP 100.

In this way, by executing the seventh processing, the MFP 100 selects the type of the reception capability of the cloud server 300 to be obtained, based on the setting of the MFP 100. For example, it may be selected that the obvious capability and fixed capability of the reception capabilities of the cloud server 300 are not to be obtained. Therefore, it is possible to expect the reception of the appropriate FAX data while suppressing the increase in the processing load resulting from obtaining of the reception capability. In the meantime, the type of the capability to be obtained and the type of the setting to be selected are not limited to the above exemplified types and may be two or more types, respectively.

Figure 13:
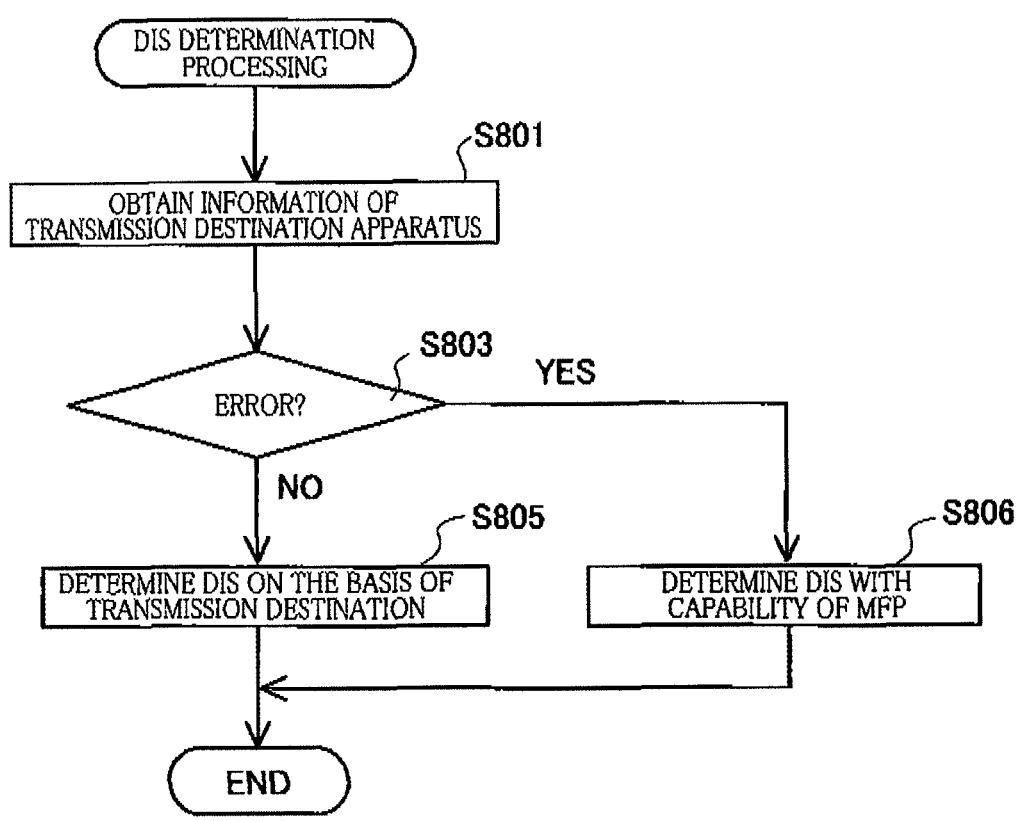
FIG. 13 is a flowchart showing a sequence of the DIS determination processing.

Subsequently, a sequence of a eighth processing of the DIS determination processing is described with reference to a flowchart of FIG. 13. The eighth processing is different from the first processing, in that the FAX data is transmitted to the FAX apparatus or printer, rather than uploaded to the cloud server 300.

Like the first processing, also in the eighth processing of the DIS determination, the MFP 100 first obtains the information of the transmission destination apparatus (S801). However, in this processing, the information is not limited to the cloud server 300 and may be the information of the transmission destination FAX apparatus or printer. In this processing, the MFP 100 obtains, as the information of the transmission destination apparatus, a current error situation such as a toner error, a sheet error and the like. Then, the MFP 100 determines whether an error occurs in the transmission destination apparatus (S803).

When it is determined that an error does not occur in the transmission destination apparatus (S803: NO), the MFP 100 determines the DIS, based on the information of the transmission destination apparatus (S805). In the meantime, the MFP 100 may determine the DIS by adding the capability of the MFP 100 to the information of the transmission destination apparatus. On the other hand, when it is determined that an error occurs in the transmission destination apparatus (S803: YES), the MFP 100 determines the DIS, based on the information of the MFP 100 (S806).

That is, according to the conventional FAX apparatus, the capability information of the transmission destination FAX apparatus is obtained from the communication history and transmitted and received. However, the current situations of the FAX apparatus are not considered. For example, when the transmission destination apparatus is a FAX apparatus or printer and the error such as the toner error and the sheet error occurs in the apparatus, there is a possibility that the data cannot be transmitted.

In contrast, by executing the eighth processing, the MFP 100 can perform the processing of appropriately determining the DIS even when the data is transmitted to the FAX apparatus or printer. That is, the MFP 100 determines the DIS on the basis of the reception capability of the MFP 100 or reception capability of the transmission destination apparatus, depending on whether an error occurs in the transmission destination apparatus. Therefore, even though the error occurs in the transmission destination apparatus when the FAX data is received in the MFP 100, a possibility that a problem occurs in the operation of the MFP 100 is low.

As specifically described above, the MFP 100 of this processing has the upload function of uploading the FAX data received from the FAX apparatus 400 and the like to the cloud server 300. If the upload function is valid, when the arrival of the signal indicating the transmission of the FAX is detected, the MFP 100 obtains the reception capability of the cloud server 300, determines the DIS on the basis of the obtained capability and notifies the determined DIS to the FAX apparatus 400, which is the transmission source. Therefore, it is possible to expect the reception of the FAX data suitable for the capability of the cloud server 300. Thereby, when uploading the received FAX data to the other apparatus, it is possible to expect the favorable communication with the corresponding apparatus.

In the meantime, the above illustrative embodiment is just exemplary and does not limit the present invention. Therefore, a variety of improvements and modifications can be made without departing from the gist of the present invention. For example, the present invention is not limited to the MFP and can be applied to a copier, a FAX apparatus and the like having functions of receiving and uploading FAX data.

Also, for example, the various thresholds for classifying the free capacity of the cloud server 300, the operating load of the MFP 100, the error occurrence probability and the level of the communication speed are not limited to one level and the thresholds having a plurality of levels may be provided. Also, the receivable range may be changed depending on the level of the obtained situation. Also, the determination contents of the respective items of the DIS illustrated in FIG. 3 are exemplary. That is, only the parts of the items may be determined and the more items may be determined.

Also, in the sequence of FIG. 2, the MFP 100 completes the transmission and reception of the FAX data and is then connected to the cloud server 300. However, the connection timing is not limited thereto and may be arbitrary. For example, the connection may be made upon the arrival the signal indicating the transmission of the FAX or before the arrival the signal indicating the transmission of the FAX.

Also, in the sequence of FIG. 2, the MFP 100 uploads the data. However, the present invention is not limited thereto when the conversion server 200 is used. For example, after the MFP 100 transmits the data to the conversion server 200, the conversion server 200 may be enabled to upload the data to the cloud server 300.

Also, for example, in the first to seventh processing, the cloud server 300 is the upload destination server. However, the present invention is not limited thereto. The present invention can be also applied to a configuration where the data is uploaded to a FAX apparatus, a printer, a single PC and the like.

Also, the processing described in the illustrative embodiment may be executed by the hardware such as a single CPU, a plurality of CPUs, an ASIC and the like or a combination thereof. Also, the processing described in the illustrative embodiment can be implemented in a variety of aspects such as a recording medium having a program for executing the processing recorded therein, a method and the like.

What is claimed is:

1. A facsimile apparatus comprising:
a first interface configured to connect to a telephone line;
a second interface configured to connect to a network, and
a controller,
wherein the controller is configured to execute:
a detection processing in which the controller detects reception of a signal indicating transmission of facsimile data;
an obtaining processing in which the controller obtains at least one of respective information of (a) an operation load of the facsimile apparatus, (b) an error occurrence probability between the facsimile apparatus and an upload destination server, (c) a free capacity of a storage unit of the upload destination server, (d) a communication speed between the facsimile apparatus and the upload destination server and (e) a conversion capability of a conversion server, as a reception capability of the upload destination server, the conversion server being configured to convert the facsimile data;
a reception processing in which the controller receives facsimile data from a transmission source apparatus through the first interface; and
an upload processing in which the controller transmits the facsimile data received in the reception processing to the upload destination server through the second interface,
wherein when executing the upload processing, the controller is configured to further execute:
a determination processing in which the controller determines, in response to the reception of the signal indicating the transmission of the facsimile data, capability information of the facsimile apparatus on the basis of the at least one of (a) the operation load, (b) the error occurrence probability, (c) the free capacity, (d) the communication speed and (e) the conversion capability obtained in the obtaining processing, and
a notification processing in which the controller notifies the transmission source apparatus of the capability information determined in the determination processing before the controller starts to receive the facsimile data from the transmission source apparatus in the reception processing.

2. The facsimile apparatus according to claim 1, wherein the controller is configured to:
notify the transmission source apparatus of the capability information through the first interface in the notification processing, and
determine the capability information by converting the reception capability into a parameter communicatable with the transmission source apparatus through the first interface in the determination processing.

3. The facsimile apparatus according to claim 1, wherein the controller is configured to determine, as at least one of a resolution, an image size, a color setting and a data format, a parameter relating to the capability information such that a processing amount of conversion processing for the facsimile data becomes smaller, in the determination processing.

4. The facsimile apparatus according to claim 1, wherein the controller is configured to execute a load judging processing, and
wherein when it is judged in the load judging processing that the operating load of the facsimile apparatus is higher than a load threshold, the controller determines, as at least one of a resolution, an image size, a color setting and a data format, a parameter relating to the capability information such that a processing amount of image processing for the facsimile data, which is performed in the facsimile apparatus, is less than a processing amount when the operating load of the facsimile apparatus is equal to or less than the load threshold, in the determination processing.

5. The facsimile apparatus according to claim 1, wherein the controller is configured to execute an error rate judging processing, and
wherein when it is judged in the error rate judging processing that the error occurrence probability between the facsimile apparatus and the upload destination server is higher than a probability threshold, the controller determines the capability information not based on a reception capability of the upload destination server but based on a reception capability of the facsimile apparatus in the determination processing.

6. The facsimile apparatus according to claim 1, wherein when the communication speed between the facsimile apparatus and the upload destination server is less than a speed threshold, the controller determines, as at least one of a resolution, an image size, a color setting and a data format, a parameter relating to the capability information such that a data amount to be transmitted to the upload destination server becomes less than a data amount to be transmitted to the upload destination server when the communication speed is equal to or greater than the speed threshold, in the determination processing.

7. The facsimile apparatus according to claim 1, wherein the controller is configured to execute a selection processing in which the controller selects a type of the reception capability of the upload destination server obtained in the obtaining processing.

8. The facsimile apparatus according to claim 1, wherein the controller is configured to obtain, as the reception capability, at least information indicating whether communication with the upload destination server is possible, in the obtaining processing.

9. The facsimile apparatus according to claim 1, wherein the controller is configured to obtain, as the reception capability, a data format that can be processed by the upload destination server, in the obtaining processing.

10. A facsimile apparatus comprising:
a first interface configured to connect to a telephone line;
a second interface configured to connect to a network, and
a controller,
wherein the controller is configured to execute:
a detection processing in which the controller detects reception of a signal indicating transmission of facsimile data;
an obtaining processing in which the controller obtains a reception capability of an upload destination server;
a reception processing in which the controller receives facsimile data from a transmission source apparatus through the first interface; and
an upload processing in which the controller transmits the facsimile data received in the reception processing to the upload destination server through the second interface,
wherein when executing the upload processing, the controller is configured to further execute:
a determination processing in which the controller determines, in response to the reception of the signal indicating the transmission of the facsimile data, capability information on the basis of at least the reception capability obtained in the obtaining processing, and
a notification processing in which the controller notifies the transmission source apparatus of the capability information determined in the determination processing before the controller starts to receive the facsimile data from the transmission source apparatus in the reception processing,
wherein the controller is configured to obtain a free capacity of a storage area of the upload destination server, as the reception capability in the obtaining processing, and
wherein when the free capacity is equal to or less than a capacity threshold, the controller is configured to determine, as at least one of a resolution, an image size, a color setting and a data format, a parameter relating to the capability information such that a data amount to be transmitted to the upload destination server becomes less than a data amount to be transmitted to the upload destination server when the free capacity is greater than the capacity threshold, in the determination processing.

11. The facsimile apparatus according to claim 10, wherein the controller is configured to:
notify the transmission source apparatus of the capability information through the first interface in the notification processing, and
determine the capability information by converting the reception capability into a parameter communicatable with the transmission source apparatus through the first interface in the determination processing.

12. The facsimile apparatus according to claim 10, wherein the controller is configured to determine, as at least one of a resolution, an image size, a color setting and a data format, a parameter relating to the capability information such that a processing amount of conversion processing for the facsimile data becomes smaller, in the determination processing.

13. The facsimile apparatus according to claim 10, wherein the controller is configured to obtain, as the reception capability, at least information indicating whether communication with the upload destination server is possible, in the obtaining processing.

14. The facsimile apparatus according to claim 10, wherein the controller is configured to obtain, as the reception capability, a data format that can be processed by the upload destination server, in the obtaining processing.

15. A facsimile apparatus comprising:
a first interface configured to connect to a telephone line;
a second interface configured to connect to a network, and
a controller,
wherein the controller is configured to execute:
a detection processing in which the controller detects reception of a signal indicating transmission of facsimile data;
an obtaining processing in which the controller obtains a reception capability of an upload destination server;
a reception processing in which the controller receives facsimile data from a transmission source apparatus through the first interface; and
an upload processing in which the controller transmits the facsimile data received in the reception processing to the upload destination server through the second interface,
wherein when executing the upload processing, the controller is configured to further execute:
a determination processing in which the controller determines, in response to the reception of the signal indicating the transmission of the facsimile data, capability information on the basis of at least the reception capability obtained in the obtaining processing, and
a notification processing in which the controller notifies the transmission source apparatus of the capability information determined in the determination processing before the controller starts to receive the facsimile data from the transmission source apparatus in the reception processing,
wherein the controller is configured to:
further obtain (a) a conversion capability of a conversion server configured to convert the facsimile data, and (b) a conversion capability of the facsimile apparatus in the obtaining processing;
when the communication with the conversion server is possible, determine the capability information based on the basis of the obtained reception capability, the obtained conversion capability of the conversion server and the obtained conversion capability of the facsimile apparatus in the determination processing; and
when the communication with the conversion server is not possible, determine the capability information not based on the obtained conversion capability of the conversion server but based on the obtained reception capability and the obtained conversion capability of the facsimile apparatus in the determination processing.

16. The facsimile apparatus according to claim 15, wherein the controller is configured to:
notify the transmission source apparatus of the capability information through the first interface in the notification processing, and
determine the capability information by converting the reception capability into a parameter communicatable with the transmission source apparatus through the first interface in the determination processing.

17. The facsimile apparatus according to claim 15, wherein the controller is configured to determine, as at least one of a resolution, an image size, a color setting and a data format, a parameter relating to the capability information such that a processing amount of conversion processing for the facsimile data becomes smaller, in the determination processing.

18. The facsimile apparatus according to claim 15, wherein the controller is configured to obtain, as the reception capability, at least information indicating whether communication with the upload destination server is possible, in the obtaining processing.

19. The facsimile apparatus according to claim 15, wherein the controller is configured to obtain, as the reception capability, a data format that can be processed by the upload destination server, in the obtaining processing.

* * * * *